(12) United States Patent
Suzuki

(10) Patent No.: US 10,569,358 B2
(45) Date of Patent: Feb. 25, 2020

(54) LASER PROCESSING SYSTEM CAPABLE OF ADJUSTING TIMING TO SWITCH OUTPUT COMMAND

(71) Applicant: FANUC CORPORATION, Minamitsuru-gun, Yamanashi (JP)

(72) Inventor: Kazuhiro Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 130 days.

(21) Appl. No.: 15/049,593

(22) Filed: Feb. 22, 2016

(65) Prior Publication Data

US 2016/0249411 A1 Aug. 25, 2016

(30) Foreign Application Priority Data

Feb. 23, 2015 (JP) .................................. 2015-033284
Jan. 18, 2016 (JP) .................................. 2016-007155

(51) Int. Cl.
*B23K 26/062* (2014.01)
*B23K 26/042* (2014.01)
(Continued)

(52) U.S. Cl.
CPC .......... *B23K 26/062* (2015.10); *B23K 26/042* (2015.10); *B23K 26/0853* (2013.01);
(Continued)

(58) Field of Classification Search
CPC ........... G05B 2219/45138; G05B 2219/45041; G05B 2219/31077; G05B 19/4103; G05B 2219/34391; G05B 2219/35304; G05B 2219/45165; G05B 2219/49384; B23K 26/0853; B23K 26/0622; B23K 26/0626; B23K 26/08; B23K 26/388; B23K 26/00; B32K 26/0861
(Continued)

(56) References Cited

U.S. PATENT DOCUMENTS 5,293,024 A * 3/1994 Sugahara ............... B23K 26/08
219/121.67
5,376,770 A 12/1994 Kuhl et al.
(Continued)

FOREIGN PATENT DOCUMENTS

CN 101288921 A 10/2008
CN 101862903 A 10/2010
(Continued)

*Primary Examiner* — Tu B Hoang
*Assistant Examiner* — Masahiko Muranami
(74) *Attorney, Agent, or Firm* — RatnerPrestia

(57) ABSTRACT

A laser processing system capable of appropriately adjusting a timing to switch a laser output command with respect to the movement of an axis, and improving synchronization accuracy between the movement of the axis and a cutting position. A block remaining time of a block in execution is compared to a predetermined switching time. When the block remaining time is equal to or larger than the switching time, a laser output command of the current block is continued. On the other hand, when the block remaining time is smaller than the switching time, the laser output command to a laser oscillator is switched from the command of the current block to a command of a block subsequent to the current block.

5 Claims, 4 Drawing Sheets

(51) Int. Cl.
*B23K 37/02* (2006.01)
*B23K 26/08* (2014.01)
*B23K 26/38* (2014.01)
*B23K 37/04* (2006.01)

(52) U.S. Cl.
CPC .......... *B23K 26/0869* (2013.01); *B23K 26/38* (2013.01); *B23K 37/0235* (2013.01); *B23K 37/0408* (2013.01)

(58) Field of Classification Search
USPC ... 219/121.6, 121.62, 121.78, 121.79, 121.8, 219/121.81, 121.82
See application file for complete search history.

(56) References Cited

U.S. PATENT DOCUMENTS

| | | | |
|---|---|---|---|
| 5,491,318 A * | 2/1996 | Sugawara | B23K 26/04 219/121.67 |
| 6,570,121 B1 * | 5/2003 | Sugahara | B23K 26/08 219/121.61 |
| 2004/0129688 A1 * | 7/2004 | Mori | B23K 26/06 219/121.61 |
| 2006/0178770 A1 * | 8/2006 | Egawa | B23K 26/08 700/166 |
| 2012/0296462 A1 * | 11/2012 | Otsuki | G05B 19/4069 700/104 |
| 2013/0200053 A1 * | 8/2013 | Bordatchev | B23K 26/04 219/121.78 |

FOREIGN PATENT DOCUMENTS

| | | | | |
|---|---|---|---|---|
| CN | 104096977 A | 10/2014 | | |
| DE | 4200632 A1 | 7/1993 | | |
| JP | 08206856 A | 8/1996 | | |
| JP | 09-108863 A | 4/1997 | | |
| JP | 10-128564 A | 5/1998 | | |
| JP | 3795854 B | * | 6/2004 | ............. B23K 26/00 |
| JP | 2004167549 A | * | 6/2004 | ............. B23K 26/00 |
| JP | 2006136923 A | 6/2006 | | |
| JP | 2008030078 A | 2/2008 | | |
| WO | WO 00/53363 A1 | 9/2000 | | |

* cited by examiner

LASER PROCESSING SYSTEM CAPABLE OF ADJUSTING TIMING TO SWITCH OUTPUT COMMAND

BACKGROUND OF THE INVENTION

1. Field of the Invention

The present invention relates to a laser processing system having a function for adjusting timing to switch a laser output command with respect to movement of an axis.

2. Description of the Related Art

Generally, in laser processing, it is necessary that a drive axis of a processing nozzle for irradiating a laser beam is moved in synchronization with outputting of the laser. Therefore, in the prior art, a laser oscillator is controlled by a numerical controller (CNC), a laser output command is calculated with the same period as a movement command of the axis, and the laser oscillator is connected to a servo amplifier so that the movement command of the axis and the laser output command are output in the same route, whereby the synchronism between the movement command of the axis and the laser output command is retained.

As a relevant prior art document, JP H10-128564 A discloses an automatic programming device having a start/end code registration part capable of registering a plural kinds of NC codes for cut-start beam ON; and a beam ON/OFF attribute change part for individually changing the kind of beam ON attribute added to a required part of a cut shape plotted on a screen by an input from a man-machine interface part, within a range of registrable kinds of the NC code for cut-start beam ON.

JP H09-108863 A discloses a laser processing device having a delay time calculating means for calculating a delay time before a movement path of a processing head approaches a target coordinate in a movement command based on data with respect to the movement command and a time constant of the acceleration when a beam on-off command is outputted; and a laser output control means for controlling the output of the laser beam of a laser oscillator and executing the beam on-off command after counting the time by the delay time calculated by the delay time calculating means when the laser output control means receives the beam on-off command.

Further, WO 2000/053363 A1 discloses a laser processing device having a program analyzing means for analyzing a processing program and outputting a movement command for each axis and an on/off command to turn on/off a laser beam; an interpolating means for performing interpolation according to the movement command and outputting a movement distance to a servo amplifier; a movement distance setting means for setting a movement distance for delay motion; and a beam on/off delay means for delaying the beam on/off command which is output to a laser oscillator, based on the actual movement distance after the on/off command is output and the movement distance for delay motion.

In the conventional laser processing device as described above, the movement command for the axis and the laser output command are synchronized with each other. However, a delay in a response of an excitation power supply of a laser oscillator, a delay time from when a laser beam is irradiated onto a workpiece to when the workpiece is actually cut, and a delay in of a data transfer time from a CNC to the oscillator, etc., are not considered in the conventional processing device, whereby laser processing accuracy may be deteriorated.

In the technique of JP H10-128564 A, although a condition of piercing can be set by the automatic programming device, the delay in the response of the laser excitation power supply is not considered. Further, the delay in the response of the laser excitation power supply is also not considered in JP H09-108863 A or WO 2000/053363 A1.

SUMMARY OF THE INVENTION

An object of the present invention is to provide a laser processing system capable of appropriately adjusting a timing to switch a laser output command with respect to the movement of an axis, and improving synchronization accuracy between the movement of the axis and a cutting position.

Accordingly, the invention provides a laser processing system comprising: a laser processing machine movable along a control axis; an axis driving part which drives the control axis; a laser oscillator which supplies a laser beam to the laser processing machine; and a controller which controls the axis driving part and the laser oscillator, wherein the controller comprises: a data generating part which generates a movement data for commanding the axis driving part and a laser output command data for commanding the laser oscillator, based on a given laser processing program; and a data transmitting part which transmits the movement data and the laser output command data generated by the data generating part to the axis driving part and the laser oscillator, respectively, at a predetermined period of time, wherein the data generating part analyzes the laser processing program, and generates a laser output command in a block of the laser processing program in execution and a laser output command in a subsequent block to the block in execution, and wherein the data generating part carries out at least one of: a first switching procedure in which a remaining time of the block in execution is calculated based on a movement velocity of the control axis and a remaining movement distance of the block in execution, and the laser output command included in the laser output command data transmitted to the laser oscillator is switched from the laser output command in the block in execution to the laser output command in the subsequent block when the remaining time is smaller than a predetermined switching time; and a second switching procedure in which an execution time of the block in execution is calculated based on the movement velocity of the control axis and a movement distance of the block in execution, and the laser output command included in the laser output command data transmitted to the laser oscillator is switched from the laser output command in a block prior to the block in execution to the laser output command in the block in execution when the execution time is smaller than a predetermined switching time.

In a preferred embodiment, the switching time is determined based on at least one of: a rise time of a laser excitation power supply; a time from when the laser beam is irradiated to a workpiece to when the workpiece is actually cut; a delay time regarding data transmission from the controller to the laser oscillator; and a delay time of a servo for driving the control axis.

In a preferred embodiment, the switching time when the irradiation of the laser beam is started and the switching time when the irradiation of the laser beam is stopped are individually determined.

The switching time may be designated by a parameter or the switching time may be determined by a command included in the laser processing program.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
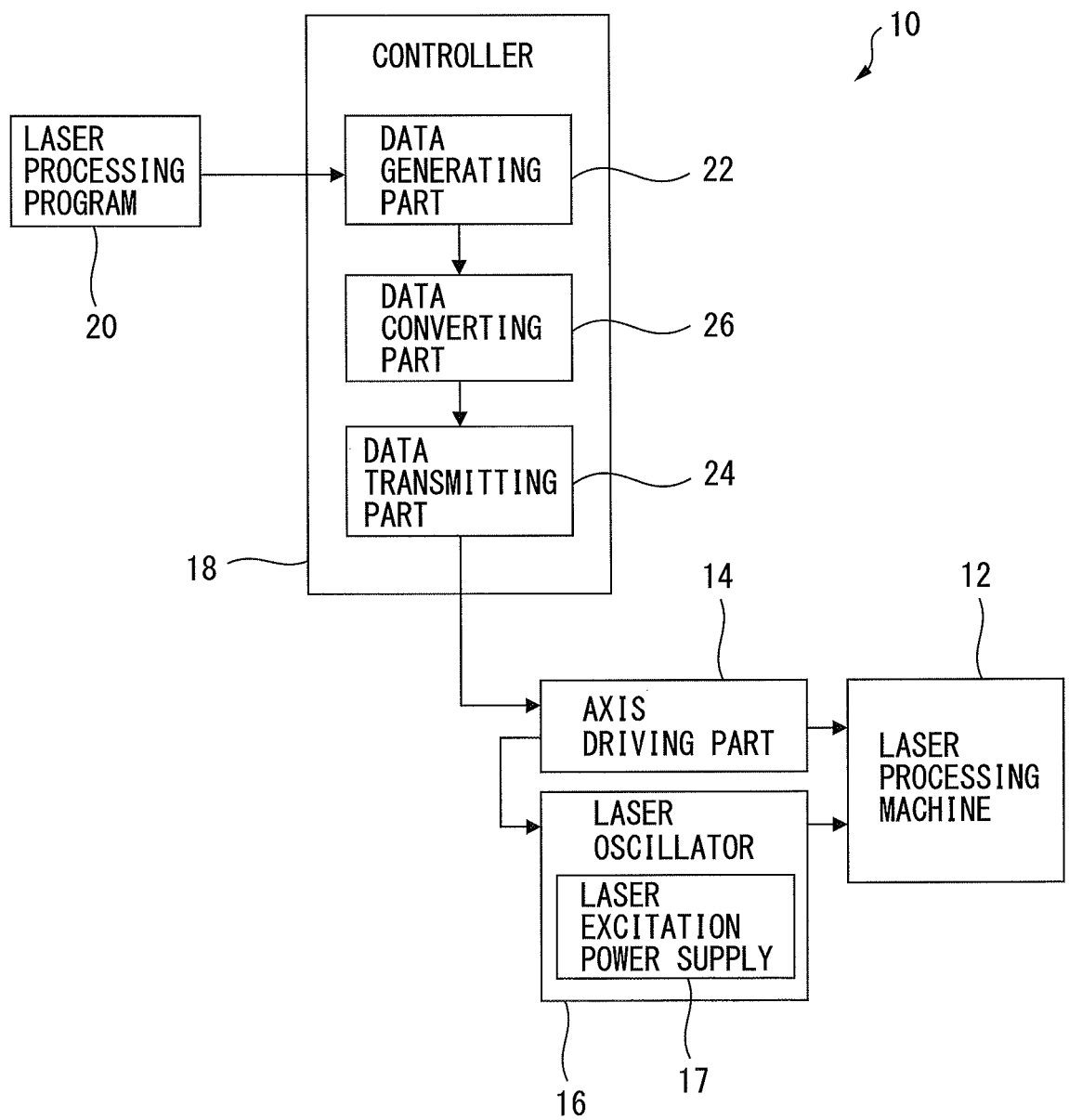
FIG. 1 is a functional block diagram of a major section of a laser processing system according to a preferred embodiment of the present invention.

FIG. 1 is a functional block diagram of a major section of a laser processing system according to a preferred embodiment of the present invention. Laser processing system 10 includes a laser processing machine 12 movable along a control axis, an axis driving part 14 which drives the control axis of laser processing machine 12, a laser oscillator 16 which supplies a laser beam to laser processing machine 12, and a controller (CNC) 18 which controls axis driving part 14 and laser oscillator 16.

Controller 18 has a data generating part 22 which reads and analyzes a given processing program 20 and generates a movement data for commanding axis driving part 14 and a laser output command data for commanding laser oscillator 16, and a data transmitting part 24 which transmits the movement data and the laser output command data generated by data generating part 22 to axis driving part 14 and laser oscillator 16, respectively, at a predetermined period of time. Optionally, controller 18 may have a data converting part 26 which converts a format of the data generated by data generating part 22 to another format suitable for data transmission by data transmitting part 24.

Figure 2:
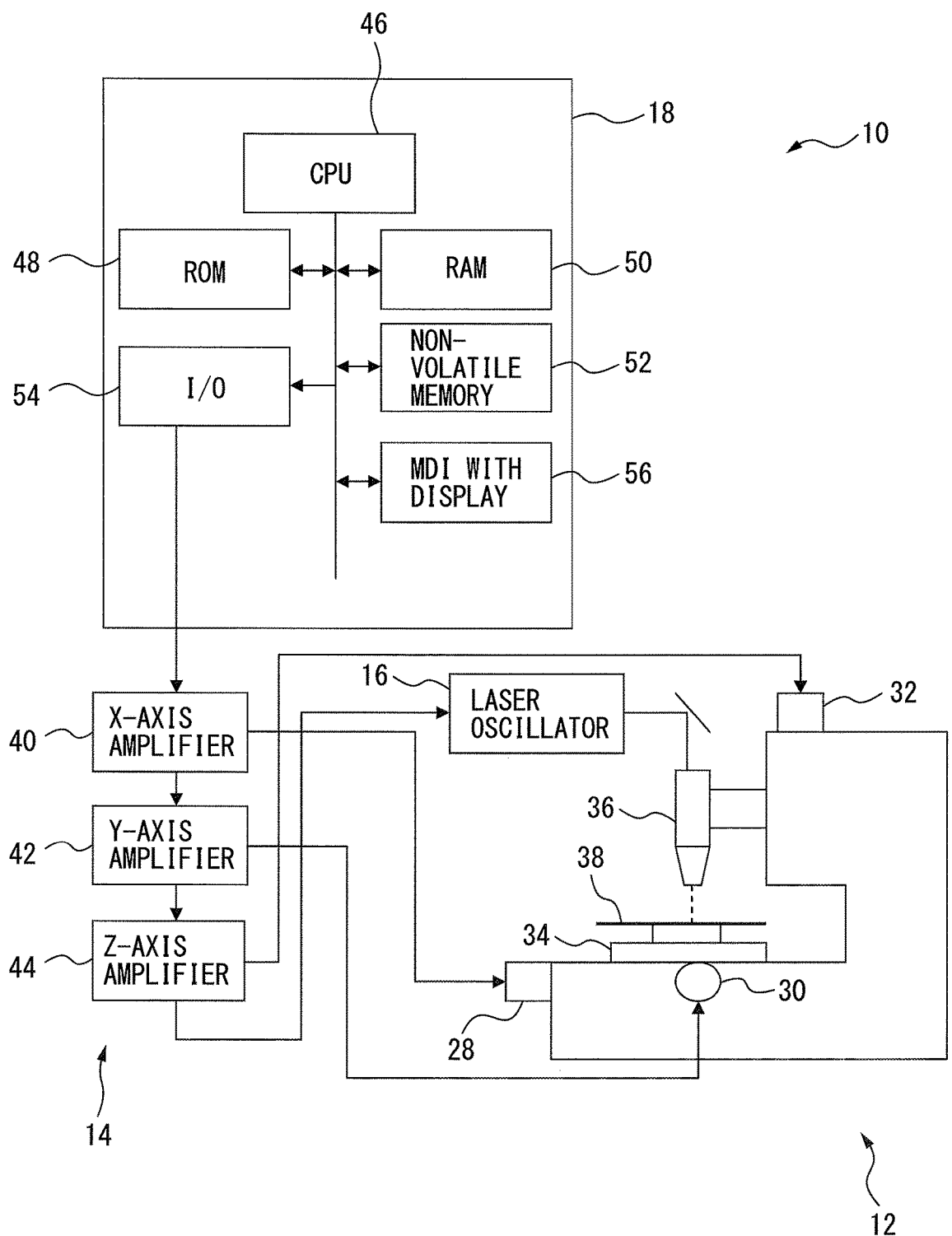
FIG. 2 is a view showing a schematic configuration of the laser processing system of FIG. 1.

FIG. 2 exemplifies a schematic configuration of laser processing system 10. Laser processing machine 12 has three linear axes (an X-axis 28, a Y-axis 30 and a Z-axis 32) orthogonal to each other, an X-Y table 34 movable along an X-Y plane by X-axis 28 and Y-axis 30, and a nozzle 36 displaceable in the Z-direction (in the generally vertical direction) relative to X-Y table 34 by Z-axis 32. In laser processing machine 12, by irradiating a laser beam from nozzle 36, desired laser processing can be carried out with respect to an object (workpiece) 38 to be processed positioned on X-Y table 34.

In the example of FIG. 2, axis driving part 14 has an X-axis amplifier 40, a Y-axis amplifier 42 and a Z-axis amplifier 44 for driving and controlling (servomotors of) X-axis 28, Y-axis 30 and Z-axis 32, respectively. On the other hand, controller 18 has a CPU 46, a ROM 48, a RAM 50, a non-volatile memory 52, a data input/output part (I/O) 54, and a manual data inputting part (MDI) 56 with a display. In controller 18, the movement data and the laser output command data as described above can be transmitted to each amplifier and laser oscillator 16 via I/O 54.

In the example of FIG. 2, CPU 46 may have functions of data generating part 22 and data converting part 26, and I/O 54 may have a function of data transmitting part 24. In addition, laser processing program 20 may be stored in RAM 50 or non-volatile memory 52, or may be stored in another device connected to controller 18.

Figure 3:
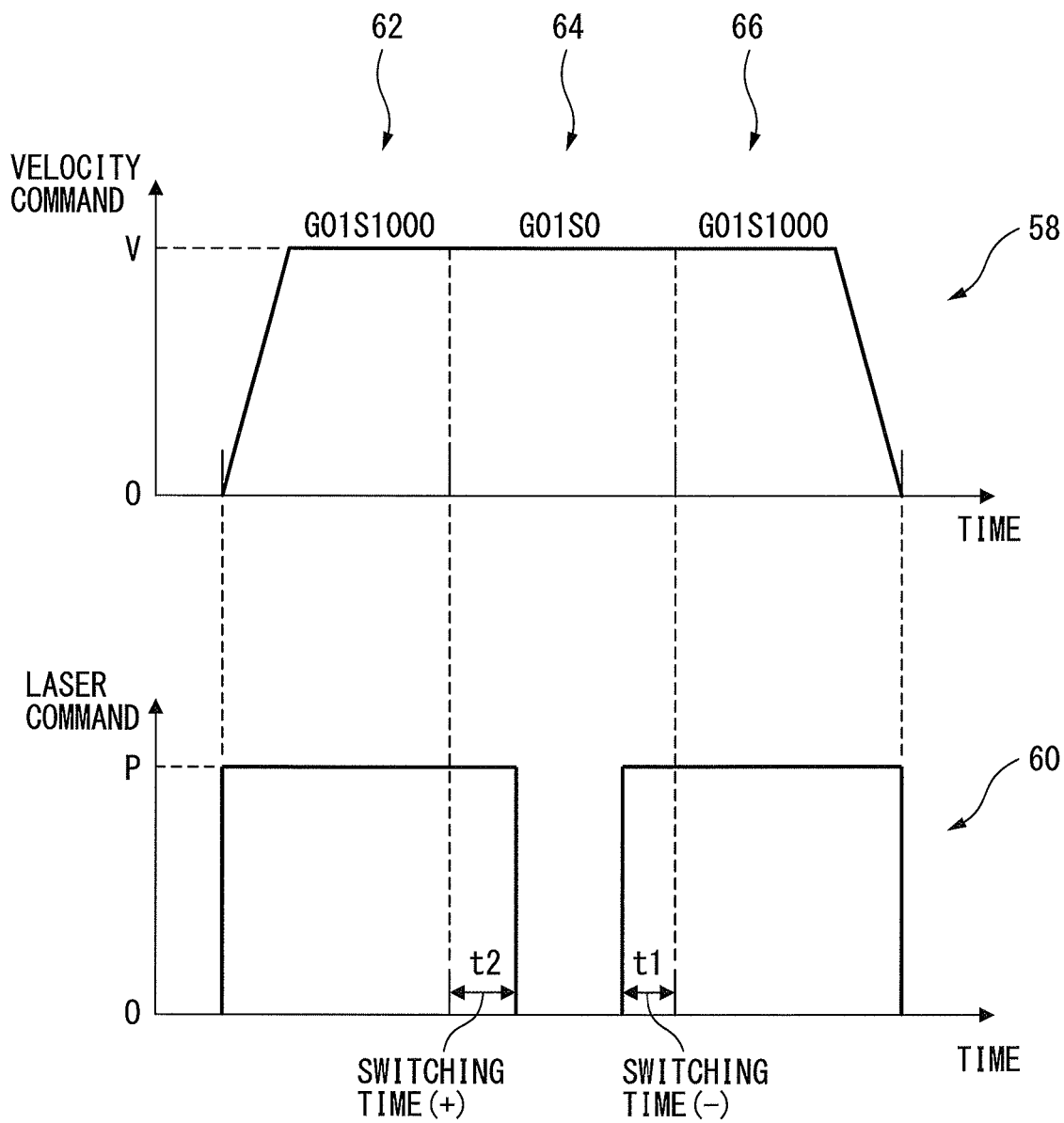
FIG. 3 is a graph showing a relationship between a laser output command and a velocity command.

Hereinafter, with reference to FIGS. 3 to 5, an example of the procedure in laser processing system 10 will be explained. FIG. 3 is a graph representing the velocity command to the control axis (or the movement of the axis) and the laser output command to the laser oscillator (or the laser output) so that the two commands can be compared to each other with respect to the same time axis. Concretely, a graph 58 represents the relationship between the time and the velocity command, and a graph 60 represents the relationship between the time and the laser command. Generally, in controller (CNC) 18, during a certain block (normally, corresponding to one line of the program, and corresponding to one unit command for axis driving part 14 or laser oscillator 16) in the processing program is executed, block information of a subsequent or later block is read so as to previously calculate an amount of movement of the axis, etc. In the example of FIG. 3, in a block 62, a portion (area) of workpiece 38 is processed by the laser beam having laser output "P" while the control axis is moved at velocity "V." Then, in a block 64, the irradiation of the laser is stopped and only the axis is moved at velocity V, and in a block 66, another portion (area) of workpiece 38 is processed by the laser beam having laser output P while the control axis is moved at velocity V.

In this regard, in the present invention, during a certain block (the current block) when the processing program is executed, a command in the subsequent block is prefetched so as to generate and store a laser output command in the subsequent block, and a remaining time of the current block is calculated based on a feed velocity of the axis and a remaining movement distance of the current block. Then, when the remaining time becomes shorter than a predetermined switching time, the laser output command generated by data generating part 22 may be switched from the command of the current block to the command of the subsequent block, whereby the laser output command is switched prior to the switching of the block in the processing program (from block 64 to block 62 in FIG. 3). Hereinafter, such a procedure is also referred to as a first switching procedure. In the example of FIG. 3, the first switching procedure is executed, when the switching time is a negative value and the laser output condition or command should be output earlier than the switching of the block, in view of the response delay time of the laser excitation power supply and the time from when the laser beam is irradiated to the workpiece to when the workpiece is actually cut, etc.

On the other hand, after the execution of the prior block of the processing program is completed, the command in the prior block may be continued even when the execution of the current block is started. Then, when the execution time of the current clock in execution becomes longer than a predetermined switching time, the laser output command may be switched from the command of the prior block to the command of the current block (i.e., the laser output command may be switched later than the switching of the block in the processing program (from block 62 to block 64 in FIG. 3). Hereinafter, such a procedure is also referred to as a second switching procedure. In the example of FIG. 3, the second switching procedure is executed, when the switching time is a positive value and the laser output condition or command should be output later than the switching of the block, in view of the delay time of the servo for driving the control axis, etc.

Figure 4:
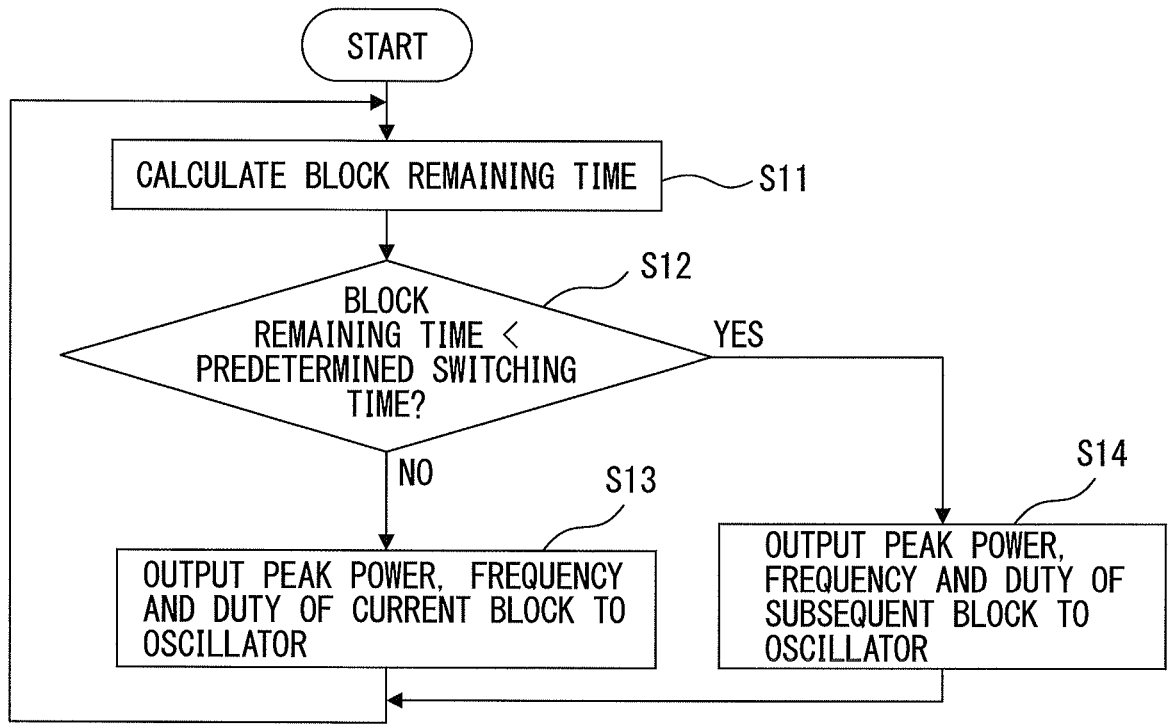
FIG. 4 is a flowchart showing an example of a first procedure in the laser processing system of the present invention.

FIG. 4 is a flowchart showing the first switching procedure in detail. First, in step S11, the remaining time of block 64 in execution is calculated (i.e., the remaining distance of block 64 is divided by the movement velocity of the control axis). In the next step S12, the calculated remaining time (or the block remaining time) is compared to a predetermined first switching time t1. When the block remaining time is equal to or larger than t1, the laser output command of current block 64 is continued, concretely, a peak power, a frequency and a duty ratio for irradiating the laser beam having power P are output from controller 18 to laser oscillator 16 (step S13).

On the other hand, when the block remaining time becomes smaller than t1, the laser output command to laser oscillator 16 is switched from the command of current block 64 to the command of subsequent block 66 (step S14). In the example of FIG. 3, although the command for starting the laser irradiation is output, a command (a peak power, a frequency and a duty ratio) for irradiating the laser beam having a power different from power P may be output to laser oscillator 16. The procedure of steps S11 to S14 is repeated at predetermined control intervals.

Switching time t1 is determined based on at least the response delay time of laser excitation power supply 17 (see FIG. 1) of laser oscillator 16, and the response delay time may include a rise time (or a leasing edge time) and a fall time (or a trailing edge time) of laser excitation power supply 17. In the present invention, taking into consideration the rise time (from when the command for starting the laser irradiation is transmitted to the laser oscillator to when the laser beam is actually irradiated) and the fall time (from when the command for stopping the laser irradiation is transmitted to the laser oscillator to when the irradiation of the laser beam is actually stopped) in the actual laser processing, the laser output command is switched before the switching of the block, by the switching time corresponding to the rise time or the fall time. By virtue of this, the synchronization accuracy between the movement of the axis and the cutting position of the workpiece can be significantly improved, and the laser processing can be carried out with high accuracy.

The first switching time may be determined based on a time from when the laser beam irradiated to workpiece 38 and to when workpiece 38 is actually cut, and a delay time while the data is transmitted from controller 18 to laser oscillator 16, as well as based on the response delay time of laser excitation power supply 17. By taking into consideration (normally, adding) these times, the synchronization accuracy between the movement of the axis and the cutting position of the workpiece is further improved.

Figure 5:
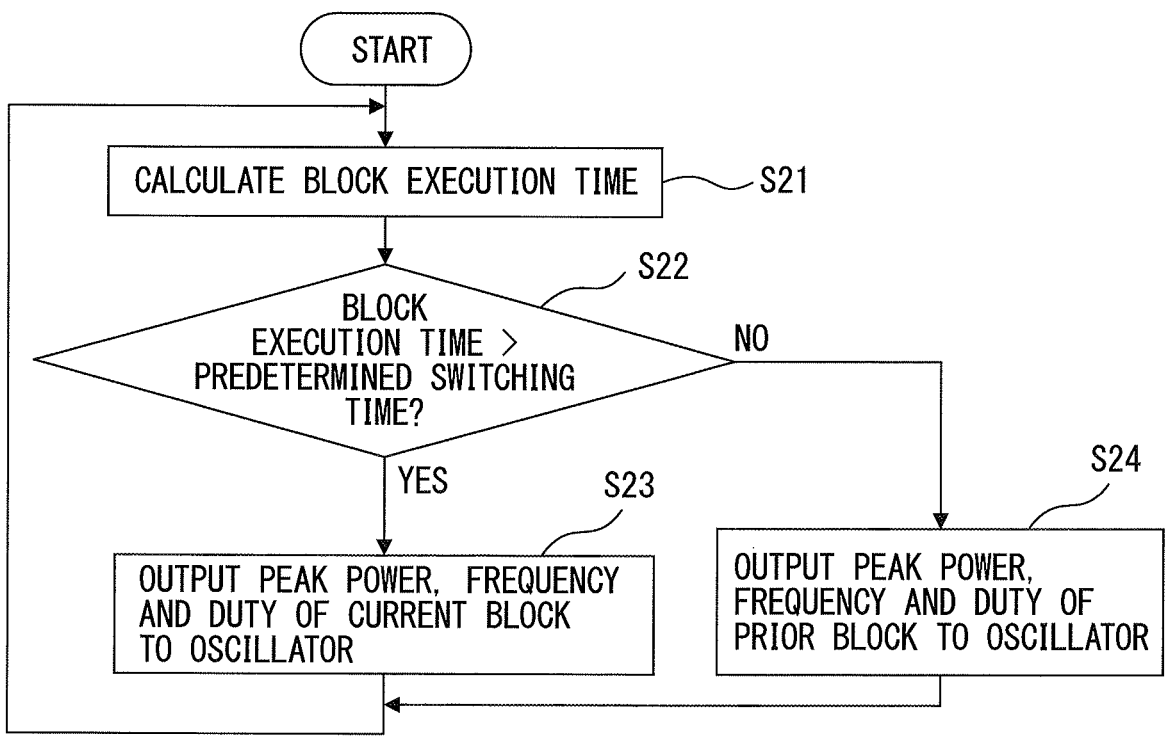
FIG. 5 is a flowchart showing an example of a second procedure in the laser processing system of the present invention.

FIG. 5 is a flowchart showing the second switching procedure in detail. First, in step S21, the execution time (or elapsed time) of block 64 in execution is calculated (i.e., the movement distance of block 64 is divided by the movement velocity of the control axis). In the next step S22, the calculated execution time (or the block execution time) is compared to a predetermined second switching time t2. When the block execution time is equal to or smaller than t2, the laser output command of block 62 before current block 64 is continued (step S23). In the example of FIG. 3, the command for irradiating the laser beam is continued. However, a command (a peak power, a frequency and a duty ratio) for irradiating the laser beam having a power different from power P may be output to laser oscillator 16.

On the other hand, when the block execution time is larger than t2, the laser output command to laser oscillator 16 is switched from the command of prior block 62 to the command of current block 64 (step S24). In the example of FIG. 3, the command for stopping the laser beam having power P is output. The procedure of steps S21 to S24 is repeated at predetermined control intervals.

The second switching procedure is common with the first switching procedure in that the laser output command is switched earlier than the switching of the block, in view of the response delay time of laser excitation power supply 17, etc. However, in the second switching procedure, in view of the delay time (or a time constant) of the servo, the start time of the block (block 64 in the example of FIG. 3) is set earlier by the time longer than the response delay time, etc. As a result, the laser output command is switched after the prior block (block 62) is terminated (or after block 64 is started). As such, even when the velocity command of the axis is set in view of the servo delay time, etc., the present invention can be applied to the laser processing system by determining the second switching time in view of the servo delay time as well as the response delay time of laser excitation power supply 17, etc.

As described above, in the first switching procedure, the laser output command is switched before the block in execution is terminated, by the predetermined switching time (t1). On the other hand, in the second switching procedure, the laser output command is switched after the block in execution is started, by the predetermined switching time (t2). In other words, it could be considered that the switching time in the first switching procedure is a negative (minus) value, and the switching time in the first switching procedure is a positive (plus) value. Therefore, the switching procedure may be selected depending on a plus minus sign of the determined switching time (concretely, the first switching procedure is carried out when the switching time is a minus value, and the second switching procedure is carried out when the switching time is a plus value). Otherwise, there may be provided a means to select or determine as to which the first or second switching procedure should be carried out, and then the switching time may be determined as a positive value (or may be determined as an absolute value).

For example, the rise time and the fall time of laser excitation power supply 17 may be different from each other. Further, the time from when the laser beam is irradiated to the workpiece to when the workpiece is actually cut, and the time from when the irradiation of the laser beam is stopped to when the cutting of the workpiece is actually stopped, are normally different from each other. Therefore, as in the first and second switching procedures as shown in FIG. 3, it is preferable that the switching time be individually determined in the case the irradiation of the laser beam is started and in the case the irradiation of the laser beam is stopped. By virtue of this, the accuracy of the cutting length of the workpiece can be improved by correcting the difference between the cases.

Depending on the material or the thickness of the workpiece, the time from when the laser beam is irradiated to the workpiece to when the workpiece is actually cut, and the time from when the irradiation of the laser beam is stopped to when the cutting of the workpiece is actually stopped, may be varied. Therefore, it is preferable that the operator can designate the switching time as a parameter via a suitable input device, etc. By virtue of this, the timing of ON/OFF of the laser beam can be arbitrarily adjusted, and thus a degree of freedom regarding the adjustment of the cutting position of the workpiece can be improved. Otherwise, the switching time may be determined based on a command included in the processing program. By virtue of this, when the switching time should be corrected due to the delay time of the servo (for example, when the processing velocity is changed), a degree of freedom of the correction of the switching time can be improved and the switching time can be precisely determined.

In the above embodiment, laser processing machine 12 has three axes (X-, Y- and Z-axes), workpiece 38 (or X-Y table 34 on which the workpiece is mounted) is movable on the X-Y plane, and processing nozzle 36 is movable in the Z-direction. However, the present invention is not limited to such a configuration, and can be applied to a laser processing machine having at least one control axis by which a processing nozzle can be moved relative to a workpiece.

According to the present invention, even when the response time of the laser excitation power supply is long, the synchronization accuracy between the movement of the axis and the cutting position of the workpiece can be improved, whereby the laser processing accuracy can also be improved.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A laser processing system comprising:
a laser processing machine movable along a control axis;
an axis driver which drives the control axis;
a laser oscillator which supplies a laser beam to the laser processing machine; and
a controller which controls the axis driver and the laser oscillator,
wherein the controller comprises a processor, a memory, and a data input/output part, and is configured to:
generate a movement data for commanding the axis driver and a laser output command data for commanding the laser oscillator, based on a given laser processing program; and
transmit the movement data and the laser output command data to the axis driver and the laser oscillator, respectively,
wherein the controller analyzes the laser processing program, and generates: 1) a laser output command in a second block in a sequence of the laser processing program in execution, 2) a laser output command in a first block in the sequence of the laser processing program executed prior to the second block in execution, and 3) a laser output command in a third block in the sequence of the laser processing program executed subsequent to the second block in execution, and
wherein the controller carries out at least one of:
a first switching procedure in which the axis drive and the laser oscillator perform laser machining based on a modified movement data and a modified laser output command data within a modified laser processing program transmitted from the controller, in which:
during the second block in execution prior to a laser cutting scheduled for the third block, a remaining time of the second block in execution is calculated based on a movement velocity of the control axis and a remaining movement distance of the second block in execution, and
when the remaining time is smaller than a predetermined first switching time determined based on a time period delay from when irradiation of the laser begins and when the irradiation of the laser begins cutting, the laser output command included in the laser output command data transmitted to the laser oscillator is switched from the laser output command in the second block in execution to the laser output command in the third block to begin the irradiation while executing the second block such that the laser begins cutting as scheduled in the third block; and
a second switching procedure in which the axis drive and the laser oscillator perform laser machining based on a modified movement data and a modified laser output command data within a modified laser processing program transmitted from the controller, in which:
during the first block in execution where laser cutting is being performed prior to the laser cutting scheduled to stop in the second block, an execution time of the first block in execution is calculated based on the movement velocity of the control axis and a movement distance of the first block in execution, and
when the execution time is larger than a predetermined second switching time determined based on a time period delay in movement of the laser processing machine along the control axis, the laser output command included in the laser output command data transmitted to the laser oscillator is switched from the laser output command in the second block to the laser output command in the first block in execution to continue the irradiation while executing the second block, and
wherein the laser output command in the second block is a scheduled command for stopping the laser irradiation, the laser output command in the first block is a scheduled command for irradiating the laser beam, and the laser output command in the third block is a scheduled command for irradiating the laser beam.

2. The laser processing system as set forth in claim 1, wherein the first predetermined first switching time and the predetermined second switching time are determined based on at least one of: a rise time of a laser excitation power supply; a time from when the laser beam is irradiated to a workpiece to when the workpiece is actually cut; a delay time regarding data transmission from the controller to the laser oscillator; and a delay time of a servo for driving the control axis.

3. The laser processing system as set forth in claim 1, wherein the first predetermined first switching time and the predetermined second switching time are individually determined, and correspond to times when the irradiation of the laser beam is started and when the irradiation of the laser beam is stopped.

4. The laser processing system as set forth in claim 1, wherein the predetermined first switching time and the predetermined second switching time are designated by a parameter.

5. The laser processing system as set forth in claim 1, wherein the predetermined first switching time and the predetermined second switching time are determined by a command included in the laser processing program.

* * * * *